No. 682,431. Patented Sept. 10, 1901.
C. E. SANSOUCY.
CATTLE GUARD.
(Application filed Apr. 25, 1901.)
(No Model.) 3 Sheets—Sheet 1.
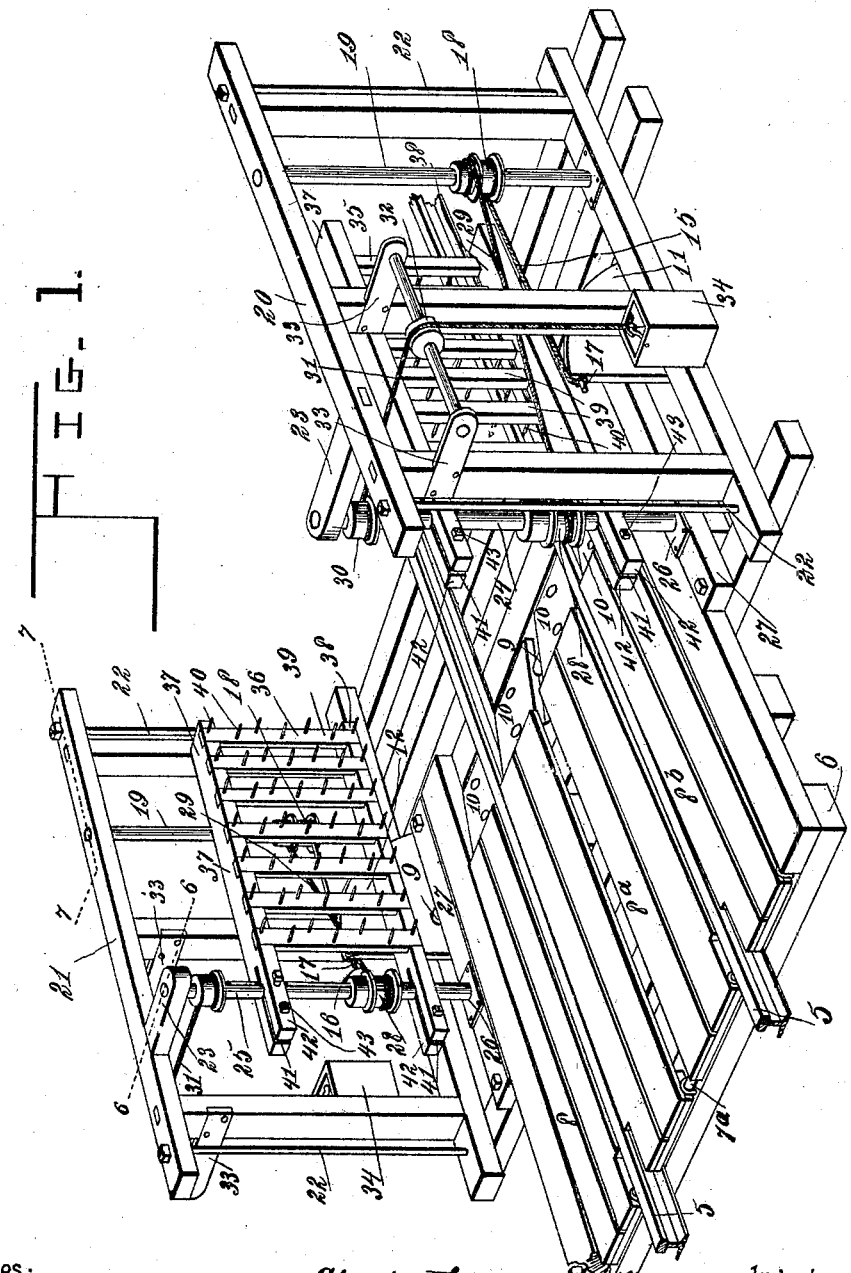
Witnesses:
J. F. Groat
H. H. Bernhof
Charles Edmond Sansoucy, Inventor
By Marion & Marion
Attorneys

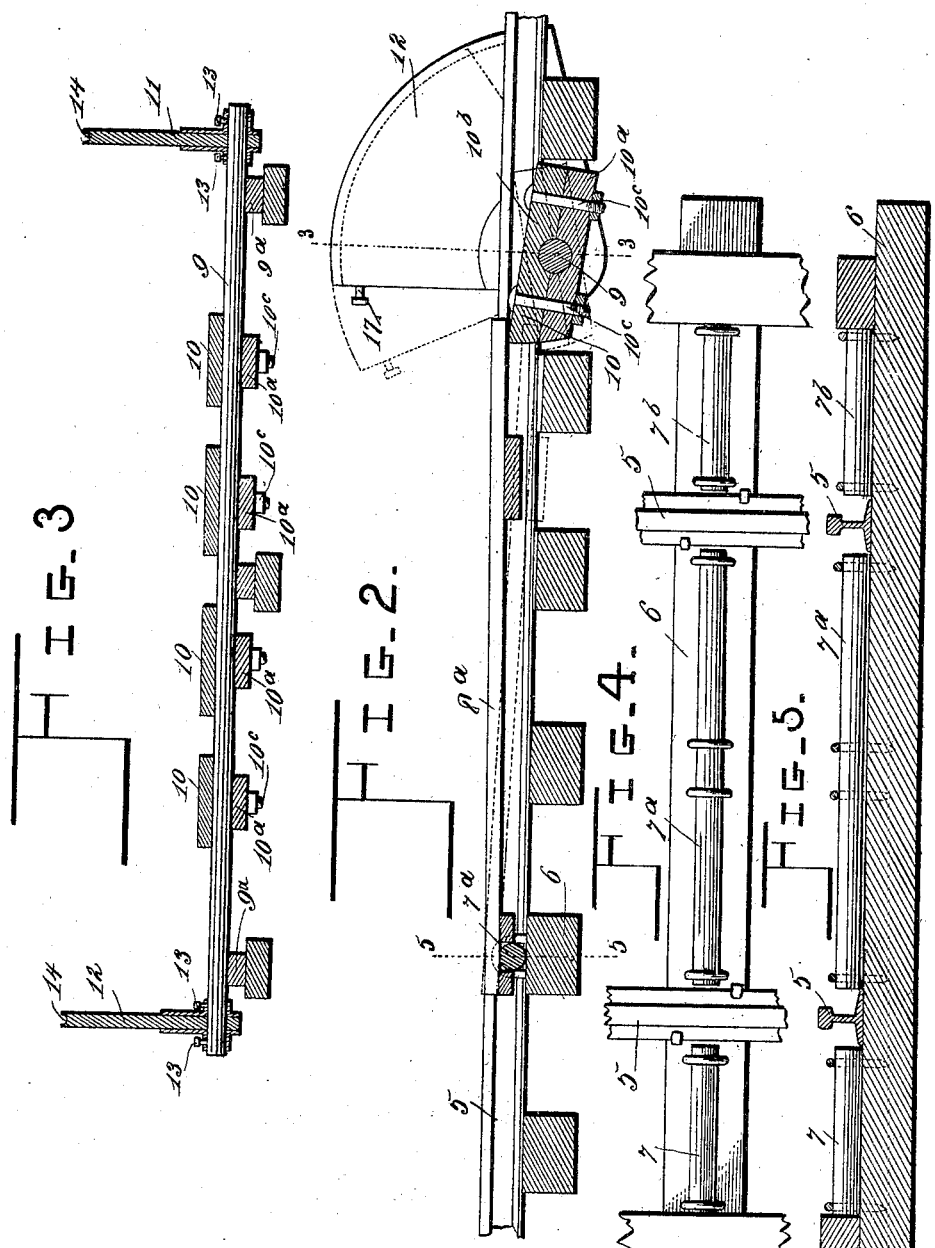

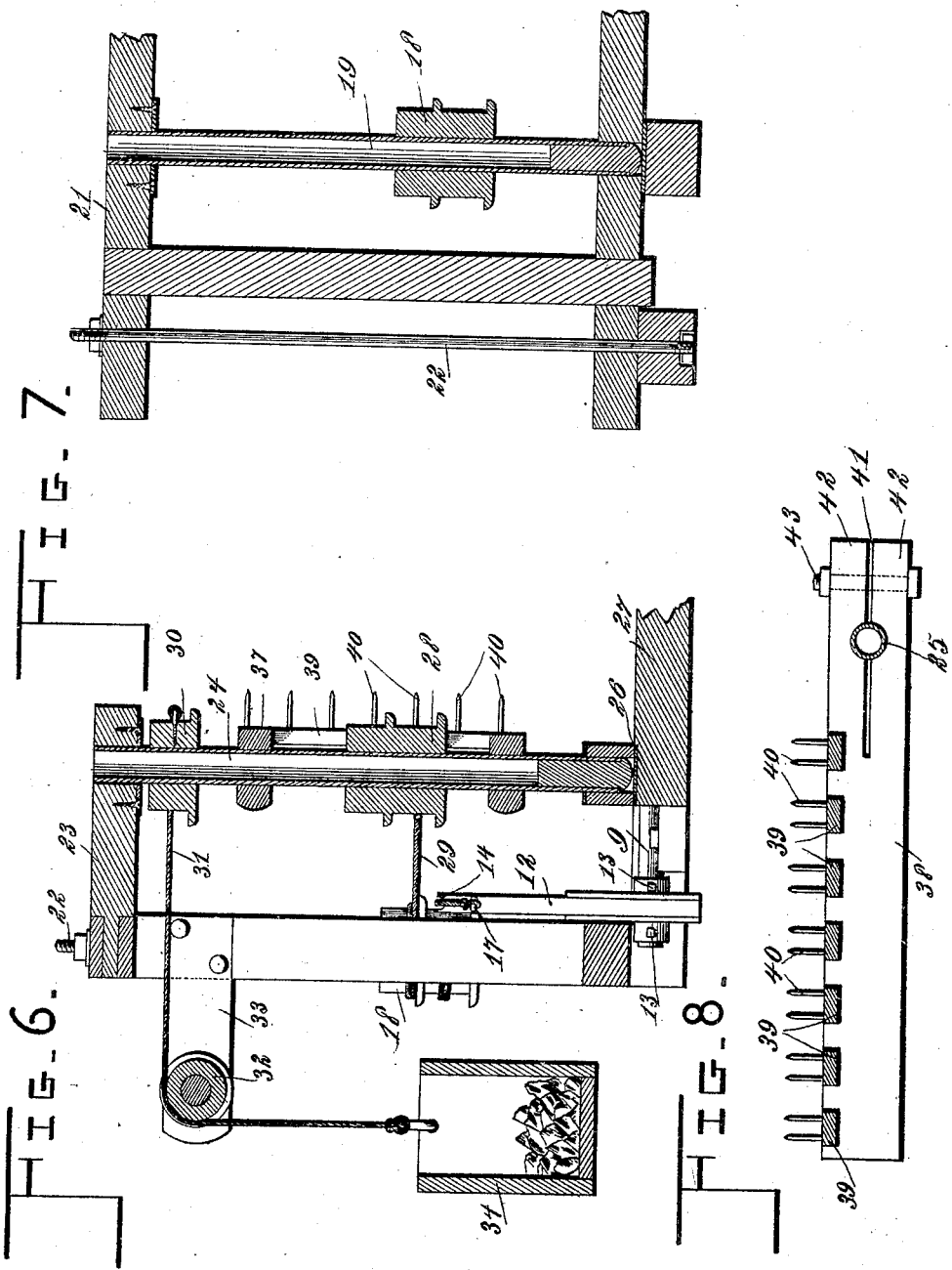

UNITED STATES PATENT OFFICE.

CHARLES EDMOND SANSOUCY, OF EVELETH, MINNESOTA, ASSIGNOR OF TWO-THIRDS TO ANDREW N. PETERSON AND SAMUEL PERRAULT, OF SAME PLACE.

CATTLE-GUARD.

SPECIFICATION forming part of Letters Patent No. 682,431, dated September 10, 1901.

Application filed April 25, 1901. Serial No. 57,416. (No model.)

*To all whom it may concern:*

Be it known that I, CHARLES EDMOND SANSOUCY, a citizen of the United States of America, residing at Eveleth, county of St. Louis, State of Minnesota, have invented certain new and useful Improvements in Cattle-Guards; and I do hereby declare that the following is a full, clear, and exact description of the invention, such as will enable others skilled in the art to which it appertains to make and use the same.

My invention relates to improvements in cattle-guards, and one object of the invention is to provide a simple apparatus adapted to be easily applied to ordinary railway-tracks adjacent to a bridge or other section of track, which it is desired to protect from the incursions of a horse or other animal.

Further objects of the invention are to provide means for automatically throwing a barrier in the path of the animal as it walks upon the track, to make the barrier prick an animal which approaches it when in its closed position, and to simplify the construction with a view to minimizing the cost of installation.

With these ends in view the invention consists in the novel combination, construction, and arrangement of parts, which will be hereinafter fully described and claimed.

In the drawings hereto annexed, forming a part of this specification, Figure 1 is a perspective view of a cattle-card embodying my invention and shown in operative relation to a portion of a railway-track. Fig. 2 is a longitudinal sectional view thereof taken centrally through the track. Fig. 3 is a vertical cross-section in the plane of the dotted line 3 3 on Fig. 2. Fig. 4 is a plan view of the pivotal shaft for the platform. Fig. 5 is a sectional elevation on the line 5 5 of Fig. 2, Fig. 6 is a vertical cross-section through a part of the cattle-guard, the plane of the section being indicated by the dotted line 6 6 on Fig. 1. Fig. 7 is a vertical detail section through a part of the mechanism in the plane of the dotted line 7 7 on Fig. 1. Fig. 8 is a detail sectional view of one of the gates forming a part of the barrier.

The same numerals of reference denote like parts in each of the several figures of the drawings.

5 designates the rails of an ordinary track, and on one of the ties 6 of this track are arranged or supported the sections 7, $7^a$, and $7^b$, forming horizontal pivotal shafts for a sectional platform. This platform is arranged in a horizontal position, so as to lie practically in the plane of the track-rails, as shown by Fig. 1, and said platform consists of a series of sections 8, $8^a$, and $8^b$, the same being disposed parallel to the rails and having one end thereof loosely mounted or hung on the sections 7, $7^a$, and $7^b$ of the divided shaft.

9 designates a rock-shaft, which is arranged between two of the ties of the track and which extends continuously beneath the rails. This shaft 9 is journaled in suitable bearings $9^a$, which are provided for supporting the shaft, and to the shaft are clamped a series of rocker-pieces, (indicated at 10.) The rocker-pieces correspond to the sections or members of the platform, and said platform members have their free ends arranged to rest upon the rocker-pieces 10, as more clearly shown by Fig. 2. The end portions of the rock-shaft are extended beyond opposite sides of the track, and said portions of the shaft have the quadrants 11 12, secured firmly in place by any suitable means, such as by the clamp-screws 13, represented by Fig. 3. The rocker-pieces 10 are represented by Fig. 2 as consisting of sections $10^a$ $10^b$, arranged to embrace the rock-shaft 9 and to lie against one another, and these sections are made to grip the rock-shaft tightly by the bolts $10^c$, whereby the rocker-pieces are made fast to the rock-shaft for the purpose of actuating the latter when an animal steps or stands on either member of the divided platform. The quadrants 11 12 are provided with circumferential grooves 14 in the curved edges thereof, and to these quadrants are secured the cables 15 16, each having one end attached to one of the quadrants—as, for example, by the pin 17—whereby the cable is drawn into the groove when the quadrant is turned by a rocking motion imparted to the shaft 9. The cables 15 16 lead from the quadrants to the spools 18, which are provided on the vertical counter-shafts 19, each cable being coiled one or more times in one direction around the spool.

20 21 designate the upright frames, which are secured in stationary positions on opposite sides of the track and of the divided platform, each frame consisting of suitable bottom, top, and vertical rails held firmly together by suitable tie-rods 22. The frames are provided with the inwardly-extending arms 23, in which are journaled the upper ends of the vertical gate-shafts 24 25, the lower ends of said shafts being mounted in suitable bearings 26, which are provided on suitable bottom rails 27. The gate-shafts are provided with the spools 28, each of which is made fast with one shaft intermediate of the height thereof, and from each of these spools extends a cable 29, which is passed one or more times around the spool 18 on one of the counter-shafts 19, said end of the cable passing around the spool in an opposite direction to that in which the cable 15 or 16 is coiled on said spool. The other end of the cable 29 is wrapped one or more times around the gate-shaft spool 28, and each cable 29 thus serves to connect one counter-shaft with one gate-shaft, whereby the latter will be actuated when the rock-shaft 9 is turned through the quadrant, the counter-shaft, and the intermediate set of cables. Each gate-shaft 24 or 25 is provided near its upper portion with another spool 30, around which is coiled a counterpoise-cable 31, which leads over a guide-sheave 32, that is journaled in offstanding arms 33, provided on each upright frame 22, (see Fig. 6,) the otherwise free end of said counterpoise-cable 31 being attached to a weight-receptacle 34, the latter being adapted to receive a suitable weight material. The gravity of the counterpoise normally strains the cable 31, so as to turn the gate-shaft in a direction which will maintain the gate in the open position represented by Fig. 1; but when either of the platform members is depressed the corresponding tread-pieces will be actuated to turn the rock-shaft 9, which will set in motion the intermediate train of devices, so as to turn the gate-shafts against the action of the counterpoises 34, thereby positively and automatically moving both of the gates to a closed position.

The shafts 24 25 carry the gates 35 36, which are made fast with said shafts, so as to turn therewith, and each gate is of a length equal to one-half of the space between said gate-shafts 24 25, whereby the gates will meet each other when they are moved to their closed positions, and thereby form a continuous barrier across the track. Each gate consists of a top bar 37, a bottom bar 38, and a series of transverse bars 39, the latter being provided with the prongs or spears 40, which are secured to all the cross-bars of the gate. The top and bottom bars of each gate are formed with the longitudinal slits 41, adapted to form the jaws 42, which clasp the gate-shaft, as shown by Figs. 1 and 8, and these jaws are drawn together by a bolt 43, that may be adjusted to firmly clamp the gate-bars to the gate-shaft.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

Having thus described my invention, what I claim as new is—

1. A cattle-guard comprising vertical shafts disposed at opposite sides of a railway-track, gates carried by said shafts, means for normally holding said gates in open positions, a horizontal rock-shaft provided with quadrants and with rocker members, operative connections between the quadrants and the gates, and a divided platform hung between rails of a track and overlapping the rocker members on the rock-shaft, to turn the latter by depression of either of the platform members, substantially as described.

2. A cattle-guard comprising a sectional platform having the members thereof disposed substantially in the plane of a track and hung independently of each other, a rock-shaft mounted independently of the platform members, rocker members secured fast on the rock-shaft and fitted beneath the free ends of the platform members to be actuated by the individual members of said platform, swinging gates mounted on opposite sides of the track and normally maintained in open positions, and operative connections between the rock-shaft and said gates, substantially as described.

3. A cattle-guard comprising a platform, a rock-shaft arranged to be actuated by the platform, gate-shafts erected on opposite sides of the track and each carrying a gate, spools fast on the gate-shafts, a counterpoise operatively connected to each gate, quadrants fast on the rock-shaft, and independent counter-shafts each having cables which are connected individually to the quadrants of the rock-shafts and the spools of the gate-shafts, substantially as described.

In witness whereof I have hereunto set my hand in the presence of two witnesses.

CHARLES EDMOND SANSOUCY.

Witnesses:
 LYMAN WELLER,
 DAVID WELLER.